United States Patent

[11] 3,630,511

[72] Inventors Ralph M. Evans
Glendale;
Alton L. Fritz, Phoenix, both of Ariz.
[21] Appl. No. 845,334
[22] Filed July 28, 1969
[45] Patented Dec. 28, 1971
[73] Assignee Royal Industries, Inc.
Pasadena, Calif.

[54] JOINT-FORMING APPARATUS
17 Claims, 11 Drawing Figs.
[52] U.S. Cl..................................... 269/43,
156/91, 156/544, 269/231, 269/290, 408/97
[51] Int. Cl....................................... B23b 41/00,
B23q 3/00
[50] Field of Search.......................... 269/43, 45,
217, 41, 42, 231, 204, 290, 37; 156/544, 546

[56] References Cited
UNITED STATES PATENTS
169,265  10/1875  Holdsworth................. 269/217 X
1,469,454  10/1923  Dean........................... 269/217 X
2,568,905  9/1951  Wiehsner..................... 269/43 X
2,991,669  7/1961  Stock........................... 269/45 X FOREIGN PATENTS
48,873   1909  Switzerland................. 269/231
473,513  1914  France......................... 269/43
1,278,959  1961  France......................... 269/43
1,016,945  9/1952  France......................... 269/37

Primary Examiner—Andrew R. Juhasz
Attorney—Lynn G. Foster

ABSTRACT: A joint-forming apparatus and method for bringing side-by-side workpieces into tight contiguity and joining the workpieces to present an even face-joint, the apparatus including a force-applying clamp mechanism which is longitudinally positionable at any one of a variety of positions along an elevated support beam and having spaced, power-displaceable gripping eccentrics which are pivotally carried by a bracket and actuated by a power cylinder to grip opposed workpieces and to draw the workpieces together in face-to-face alignment and into edge-to-edge tight contiguity in response to reciprocation of the eccentrics essentially normal to the gripped workpiece surfaces accompanied by pivoting of the eccentrics. Drill guide structure is provided which is adapted to be fixedly positioned over the contiguous joint of the workpieces to guide a drilling tool in fabricating screw-receiving angular blind bores across the joint at precise locations.

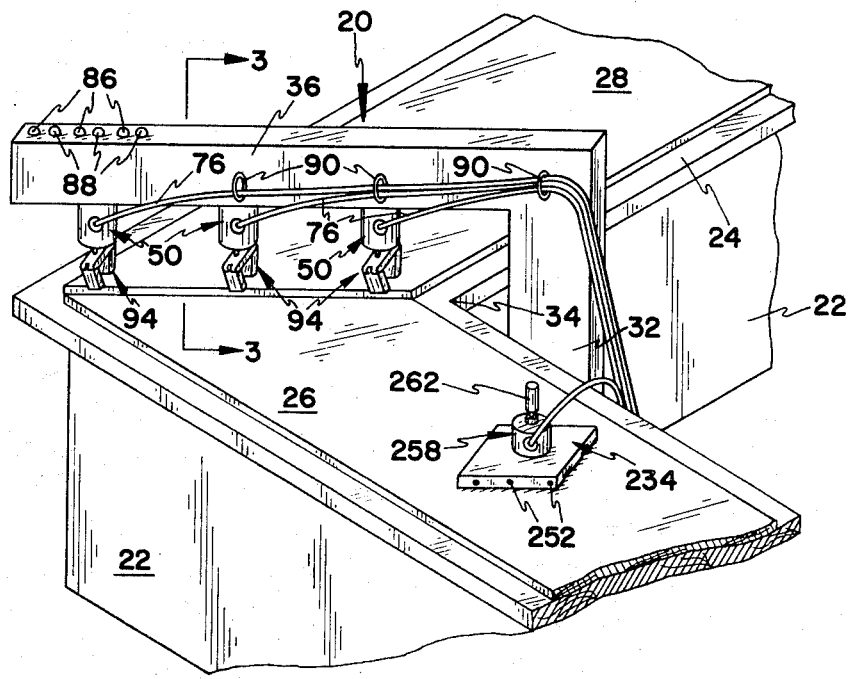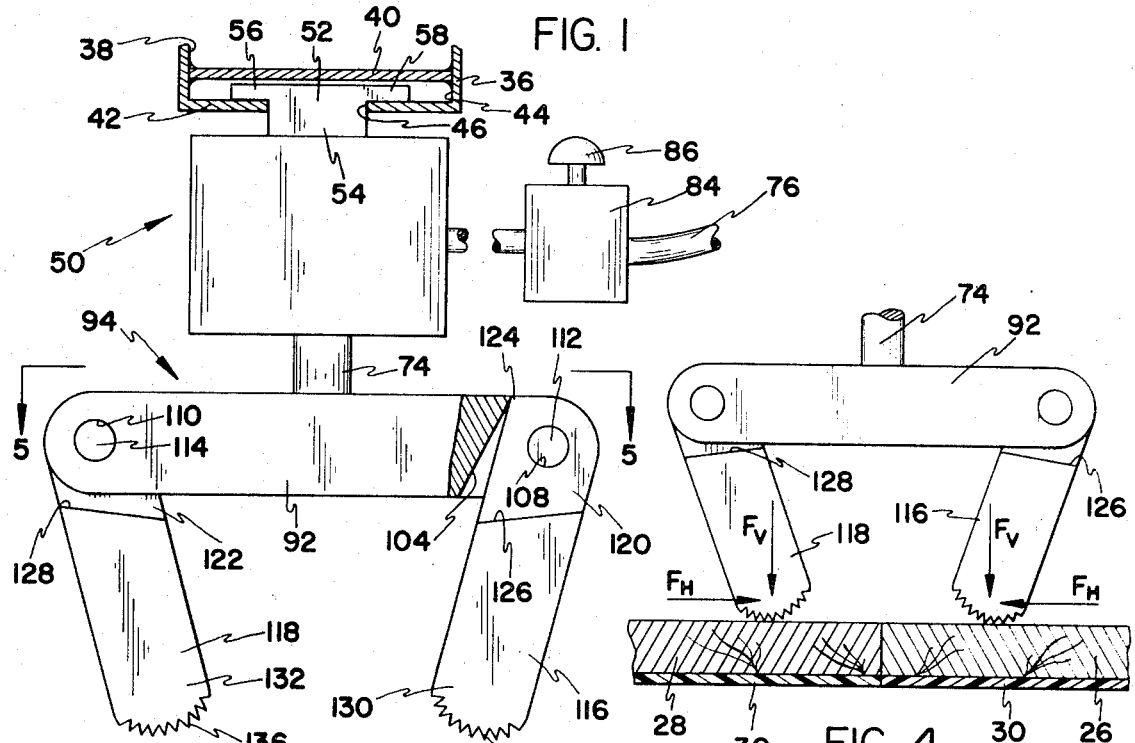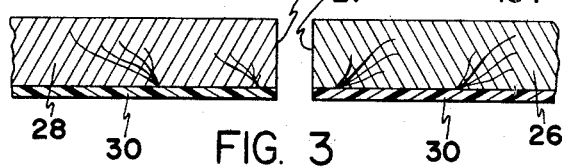

INVENTORS.
RALPH M. EVANS
ALTON L. FRITZ

BY Lynn D. Foster

ATTORNEY

PATENTED DEC 28 1971
3,630,511
SHEET 3 OF 3
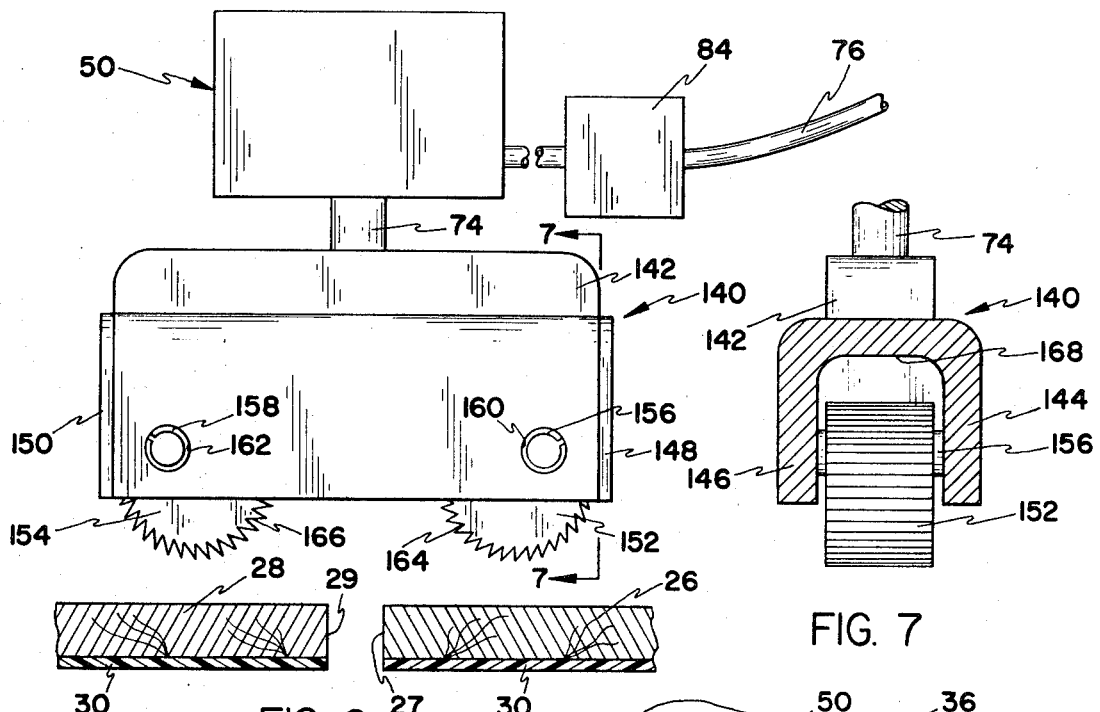
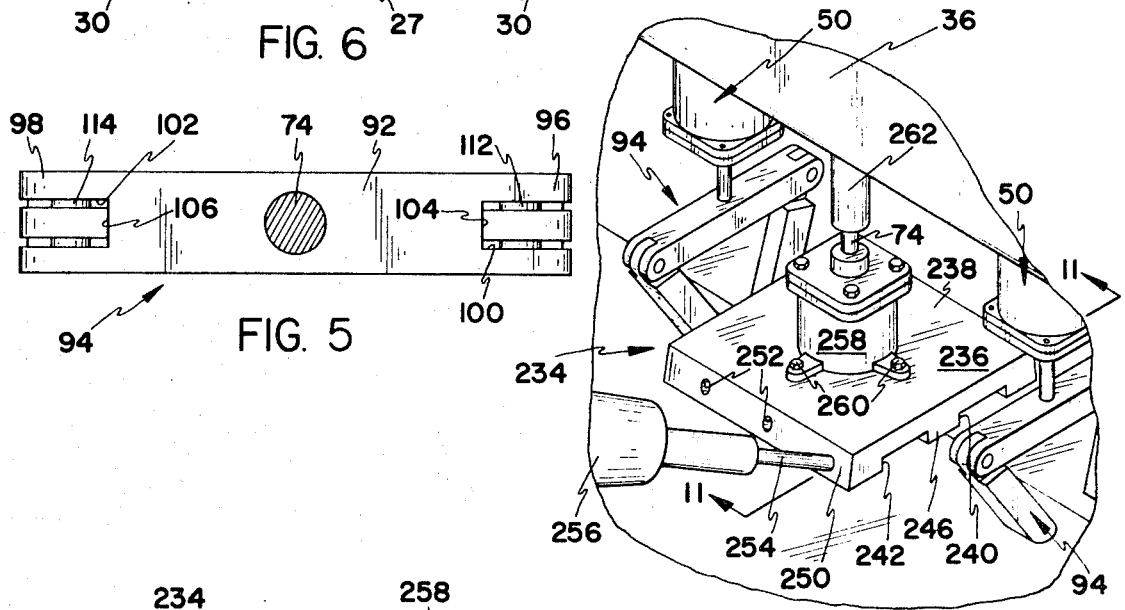
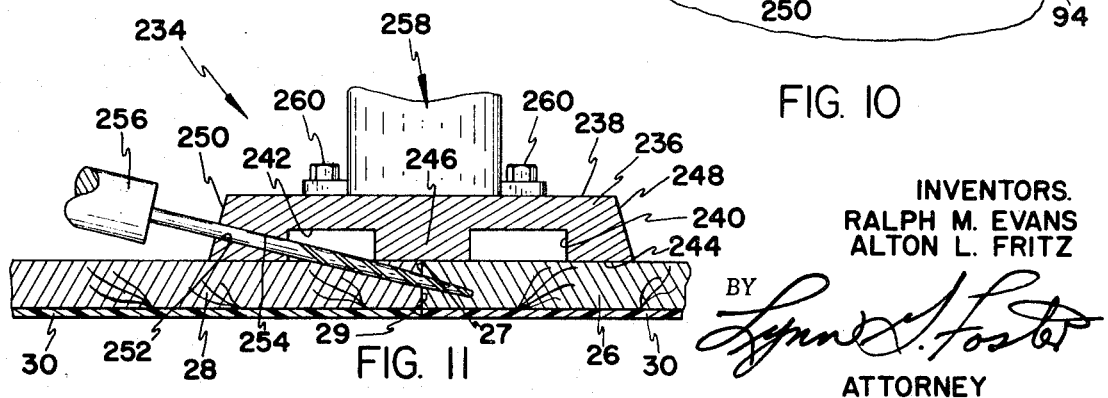
INVENTORS.
RALPH M. EVANS
ALTON L. FRITZ
BY *Lynn L. Foster*
ATTORNEY

JOINT-FORMING APPARATUS

FIELD OF THE INVENTION

The present invention relates to joint-forming apparatus and methods, and, more particularly, to structure and method for rapidly and precisely forming joints between workpieces.

DESCRIPTION OF THE PRIOR ART

Historically, the formation of joints between two workpieces disposed in edge-to-edge relation has posed difficult and frustrating problems. Particularly, when artisans seek to make such joints, cooperation and care are required to manually and accurately compress the adjacent edges of the workpieces together, to carefully drill screw holes across the joint and to make the joint permanent with screws or the like. Thus, much time and effort of several persons have been required to make the joints.

Difficulty is normally experienced in holding the workpieces together while at the same time screw-joining the workpieces. Frequently, one of the workpieces will be slightly offset from the other during the joining procedure resulting in an imperfect joint. Also, when the joint is finally made, a small, though undesirable space sometimes exists between the adjacent workpieces, which usually results when adjacent workpieces are not maintained in tight contiguity as the joining screws pass through the opposed side edges.

SUMMARY OF THE INVENTION

The present invention comprises a novel force-applying clamp mechanism which can be situated to be elevated above adjacent workpieces to be joined. The clamp mechanism is power-displaced so that spaced pivotable eccentrics engage the workpieces and forcibly urge the adjacent edges of the workpieces together so that exposed facial alignment is achieved. The workpieces are then held in the described tight contiguous and aligned relation until they are permanently joined together. Inasmuch as the direction of a force component exerted by an eccentric upon each workpiece is in a direction forcing the workpieces together and another force component is in a direction forcing the workpieces snugly against that which supports the workpieces, there is no tendency for the workpieces to shift out of the predetermined contiguous alignment. Also, the force on the workpiece is maintained so that the workpieces are restrained in the described position until they are permanently secured together. If desired, guide structure may be provided to accommodate precise fabrication of blind bores across the joint prior to making the joint permanent with screws.

OBJECTS OF THE INVENTION

With the foregoing in mind, it is a primary object of the present invention to overcome or alleviate problems of the type mentioned above.

It is another primary object of the present invention to provide a novel method and apparatus for forming improved joints more rapidly and efficiently.

It is another important object of the present invention to provide novel method and apparatus for drawing opposed edges of workpieces into tight contiguity.

Another important object of the present invention is to provide improved method and apparatus for developing uniform, evenly applied pressure so that a tight, aligned joint between workpieces can be readily achieved.

One still further object of the present invention is to provide novel power clamp structure and method which can be operated by a single person.

Another and no less important object of the present invention is to provide improved eccentric structure comprising part of a clamp mechanism.

It is one still further object of the present invention to provide novel elevated support structure accommodating placement of clamp structure at any of a variety of locations surmounting opposed side edges of adjacent workpieces.

Another significant object of the present invention is the provision for a novel and improved drill guide accommodating precise placement of bores across the juxtaposed edges of workpieces prior to the formation of a screw-connected permanent joint.

These and other objects and features of the present invention will become more fully apparent from the following description and appended claims taken in conjunction with the accompanying drawings wherein:

BRIEF DESCRIPTION OF THE DRAWINGS

FIG. 1 is a fragmentary perspective view of a presently preferred joint-forming apparatus prior to formation of a corner joint between workpieces;

FIG. 3 is generally a transverse cross section taken along line 3—3 of FIG. 1, with some parts shown schematically;

FIG. 4 is a side elevational view of the clamp structure of FIG. 3 illustrating the forces exerted upon opposed workpieces by the clamp dogs;

FIG. 5 is a cross section taken along line 5—5 of FIG. 3;

FIG. 6 is a side elevational view, shown partially schematically, of another presently preferred clamp embodiment;

FIG. 7 is a cross section taken along line 7—7 of FIG. 6;

FIG. 10 is a fragmentary perspective view of the presently preferred drill guide comprising part of the present invention; and FIG. 11 is a cross section taken along line 11—11 of FIG. 10.

DETAILED DESCRIPTION OF THE PREFERRED EMBODIMENTS

FIGS. 1-5

Figure 2:
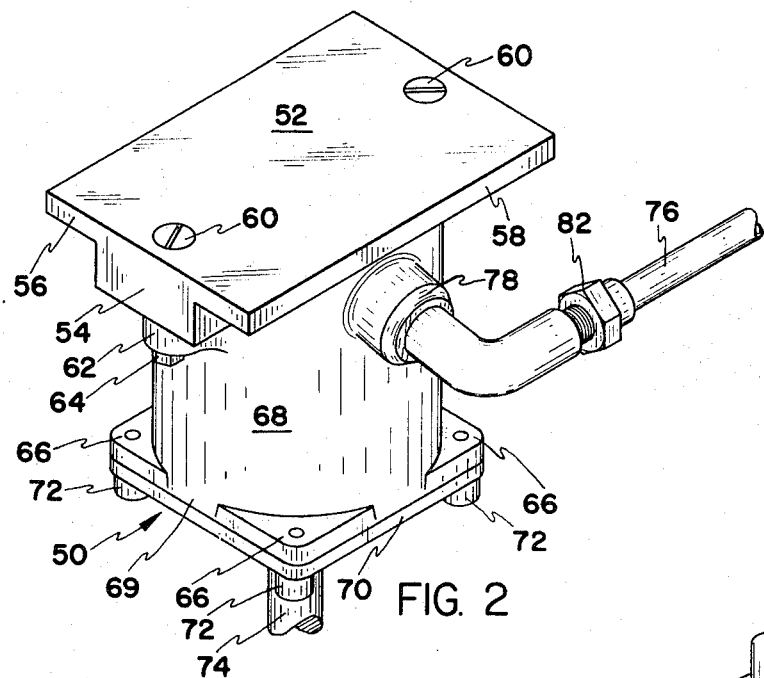
FIG. 2 is a fragmentary perspective illustration of the power displacing structure utilized with the apparatus of FIG. 1.

Referring now to FIG. 1, the joint-forming apparatus, generally designated 20, is illustrated in fragmentary perspective. As shown in FIG. 1, a work table 22, having a generally smooth work surface 24, is shown as having an V-shaped configuration. The V-shaped configuration is particularly useful for forming corner or miter joints between workpieces 26 and 28 disposed upon the work surface 24. It should be appreciated, however, that the work table 22 may be any suitable configuration, such as a rectangular, and, where joints other than corner or miter joints are to formed, configurations other than V-shaped may be preferred.

Normally, the workpieces 26 and 28 comprise a wood or woodlike base to which is laminated a synthetic veneer such as plastic 30 of the "Formica" type (see FIGS. 3 and 4). A common example of the type of workpiece mentioned is the common laminated countertop or drainboard. Workpieces 26 and 28 have respective opposed faces 27 and 29 which are joined together by the apparatus 20.

An essentially vertical pillar or column 32 is disposed adjacent the work table 22 near the corner 34 thereof. The pillar 32 has a cantilevered arm or beam 36 which is essentially rectangular in cross section. Beam 36 is preferably interiorly hollow as at 38 (FIG. 3) and, as best shown in FIG. 3, comprises a cross member 40 which is rigidly joined such as by welding to both sides of the beam 36 and which traverses substantially the entire axial length of the beam.

The bottom 42 of the beam 36 is spaced downwardly from the cross member 40 so that a channel 44 is formed therebetween. Also, an axial slot 46 is disposed in the bottom 42 of the beam 36 along essentially the entire axial length of the beam 36.

Each pneumatic cylinder, generally designated 50 and schematically shown in FIG. 3, is provided with a T-shaped carriage plate 52, best shown in FIG. 2. The carriage plate 52 comprises a downwardly projecting body 54 and outwardly projecting flanges 56 and 58 which, as illustrated in FIG. 3, rest upon the bottom 42 of the beam 36 when assembled. In the assembled condition, the body 54 is disposed in the slot 46 so that the carriage plate 52 can be axially displaced along the length of the beam in the channel 44 when the associated cylinder is in its retracted condition.

Referring again to FIG. 2, each carriage plate 52 is mounted upon one pneumatic cylinder 50 with countersunk bolts 60, which are recessed in the upper surface of the carriage plate 52 to avoid binding upon the cross member 40 (FIG. 3) as the carriage plate is displaced longitudinally along the channel 44. Each pneumatic cylinder 50 is provided with radially projecting ears 62, each of which has an axially disposed bore (not shown) through which each bolt 60 is disposed. A nut 65 secures each bolt 60 and the carriage plate 52 in immovable relation upon the pneumatic cylinder 50.

As illustrated in FIG. 2, each pneumatic cylinder 50 is provided with lugs 66, which are integral with the cylindrical housing 68 and which, together with the housing 68, form an essentially square bottom 69 of the housing 68. A generally square cover plate 70 is secured to the bottom 69 such as with capscrews 72. Preferably, a gasket or other seal is interposed between the bottom 69 and the cover plate 70 so that an air seal is formed.

Cover plate 70 is provided with a centrally disposed annular aperture (not shown) through which piston rod 74 extends and is reciprocably displaceable. The vertical displacement of piston rod 74 is accommodated by air under pressure which is communicated to the air cylinder 50 through a pressure air line 76. To receive the air under pressure, the cylinder housing 68 has an annular boss 78 with an internally threaded elbow coupling 80 which is attached to the line 76 with exteriorly threaded coupling 82. When air under pressure is communicated through line 76 to the cylinder 50, the rod 74 is downwardly displaced a known distance. When the cylinder is vented, the shaft 74 returns to its normal at rest or retracted position. The interior structure and operation of the air cylinder is conventional and forms no part of the present invention.

As is well known in the art, each pneumatic cylinder 50 is preferably actuated to the extended condition by a remote switch 84, schematically shown in FIG. 3. Although switch 84 may be an electrical switch, it is presently preferred that switch 84 comprise a conventional hydraulic switch which, when the button 86 is manually depressed, causes the shaft 74 to be axially displaced away from the pneumatic cylinder 50. If desired, another button 88 (FIG. 1) may be disposed adjacent switch structure to cause the button to return to the retracted condition. Alternatively, button 86 may be manually reset to its original position. Also, master switch structure can be used to extend and/or retract all cylinders at the same time.

As can be appreciated by reference to FIG. 1, a plurality of pneumatic cylinders 50 are preferably displaceably attached to the beam 36. The spacing between any two cylinders 50 can be selectively varied from close juxtaposition to substantially spaced over the length of beam 36, as desired.

As best shown in FIG. 1, pressure lines 76 from each of the pneumatic cylinders 50 may be disposed through loops 90 which are integral with the beam 36. Thus, the air lines 76 are prevented from interfering with the joint-forming method and apparatus. Also, if desired, the lines 76 may be carried through the interior 38 of beam 36 and pillar 32 to a pressure source (not shown).

Referring again to FIG. 3, the leading end of each rod 74 is nonrotatably attached to cross link 92 comprising part of the clamp structure generally designated 94. The cross link 92, as best shown in FIG. 5, is nonrotatably attached to the associated rod 74 at essentially the longitudinal midpoint of the link 92. Link 92 is provided with a clevis 96 and 98 at each end thereof, each clevis defining a recess 100 and 102, respectively. The inner abutment surfaces 104 and 106, each comprises the base of recesses 100 and 102, is tapered inwardly and downwardly, as best illustrated in FIG. 3, for a purpose hereinafter more fully described.

The spaced flanges of each clevis 96 and 98 is provided with a transverse bore 108 and 110 through which a pivot pin 112 or 114 is respectively disposed. Downwardly projecting clamp dogs 116 and 118 have an upper portion 120 and 122, respectively, which are reduced in transverse dimension so as to be easily interposed into each respective clevis 96 and 98. Dogs 116 and 118 are rotatably secured to the associated link 92 by the pins 112 and 114 so that the dogs 116 and 118 are arcuately displaceable for a predetermined distance relative to the link 92.

Importantly, the arcuate displacement of each link 116 and 118 is limited by the abutment surfaces 104 and 106, respectively. Referring particularly to FIG. 3, the upper portion 120 of the dog 116 is provided with a corner 124 which, in the at rest position, abuts the top edge of the tapered surface 104 so that the dog 116 is normally inclined away from the vertical toward the axis of rod 74. Dog 118 is provided with similar structure (not shown) which abuts the upper edge of tapered surface 106 so that, in the at rest condition, dog 118 is directed away from the vertical toward the axis of rod 74.

The dogs 116 and 118 are transversely enlarged at shoulders 126 and 128, respectively. Shoulders 126 and 128 are inclined downwardly toward the axis of shaft 74 in the at rest position so as to define the limits of the inward movement of dogs 116 and 118 at the pivot pins 112 and 114, respectively. Thus, the inclined surfaces 104 and 106 and the shoulders 126 and 128 function as stops and limit the closing movement of the dogs 116 and 118, respectively.

The downward ends 130 and 132 of the dogs 116 and 118 are each provided with serrations or teeth 134 and 136 which comprise gripping structure. The serrations 134 and 136, when brought into contact with the back surface of one workpiece 26 or 28, grip the workpiece, displace the workpiece adjacent the other workpiece, and thereafter, prevent relative movement of the workpieces and the respective dogs 116 and 118.

In the method of operating the joint-forming apparatus of FIGS. 1–5, the clamp structure 94 is positioned so that dog 116 and dog 118 are positioned over the respective workpiece 26 and 28. The cylinders 50, positioned as desired above the opposed edges 27 and 29, are actuated by depressing buttons 86 so that the rod 74 of each cylinder is downwardly displaced thereby bringing dogs 116 and 118 into contact with the workpieces 26 and 28, respectively. Because the dogs 116 and 118 are normally inclined out of the vertical toward the axis of associated rod 74, continued downward displacement of the link 92 will cause a vertical force $F_V$ (FIG. 4) to be exerted through the link dogs 116 and 118 upon the workpieces 26 and 28. Also, significantly, a horizontal force $F_H$ will be exerted upon the workpieces 26 and 28 in the direction of the incline of the dogs 116 and 118, as best shown in FIG. 4. Downward pressure upon the rod 74 will thus cause the workpieces 26 and 28 to move into tight butt contiguity in response to the force $F_H$ on each of the dogs 116 and 118, and to be tightly pressed against the table surface 24 so that the exposed faces of each veneer 30 of the workpieces will be in precise alignment one with the other independent of the relative thicknesses of the workpieces.

FIGS. 6 and 7

Reference is now made to FIG. 6 wherein another presently preferred clamp structure embodiment is illustrated. The clamp structure, generally designated 140, is operated by a pneumatic cylinder 50 and a hydraulic switch 84, the cylinder 50 and switch 84 being schematically shown and may be substantially identical to the cylinder 50 and switch 84 described above. Clamp structure 140 comprises a yoke 142 which is nonrotatably joined at its midpoint to the piston rod 74. Yoke 142 has downwardly projecting, spaced legs 144 and 146 which have a generally U-shaped configuration. The yoke 142 is closed at each end with plates 148 and 150.

Cams 152 and 154 are eccentrically connected to the yoke 140 by centrally hollow pins 156 and 158 which are respectively disposed through apertures 160 and 162 in the legs 144 and 146. The position of pins 156 and 158 with respect to the cams 152 and 154 respectively is eccentric as shown in FIG. 7 so that the cams 152 and 154 eccentrically rotate toward each other when the cylinder 50 is actuated to the extended position. The mentioned rotation of cams 152 and 154 is limited respectively by the end plates 148 and 150 of the yoke 140. Thus, the end plates 148 and 150 are stops which maintain the cams 152 and 154, when in the at rest condition, directed inwardly toward the longitudinal centerline or axis of rod 74 and are stops to restrict the rotation of the cams 152 and 154 to a predetermined amount.

Each of the cams 152 and 154 are provided with peripheral transversely directed serrations 164 and 166, respectively, which, when the cams 152 and 154 are brought in engagement with workpieces 26 and 28, engage, grip, displace and hold the respective workpieces. Continued downward displacement of the yoke 140 causes cams 152 and 154 to revolve inwardly toward one another thereby forcing the edges 27 and 29 of the respective workpieces 26 and 28 into tight contiguity. The inward rotation of the cams 152 and 154 is limited by the upper internal surface 168 of yoke 142 (see FIG. 7). Thus, surface 168 of yoke 142 provides a stop to limit the upward rotation of cams 152 and 154.

Figure 8:
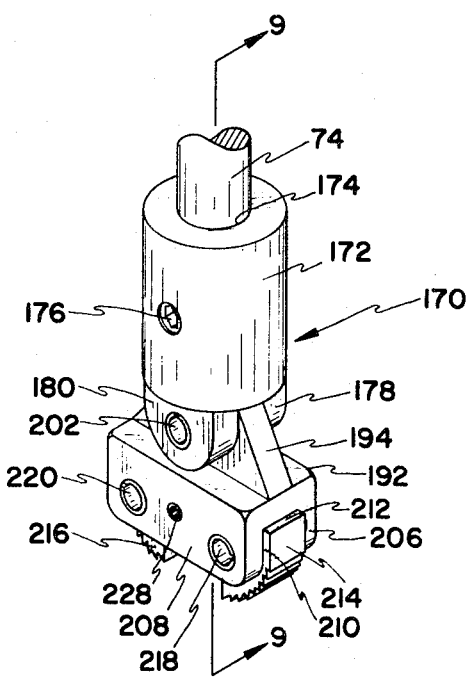
FIG. 8 is a fragmentary perspective view of another presently preferred clamp embodiment of the invention.
Figure 9:
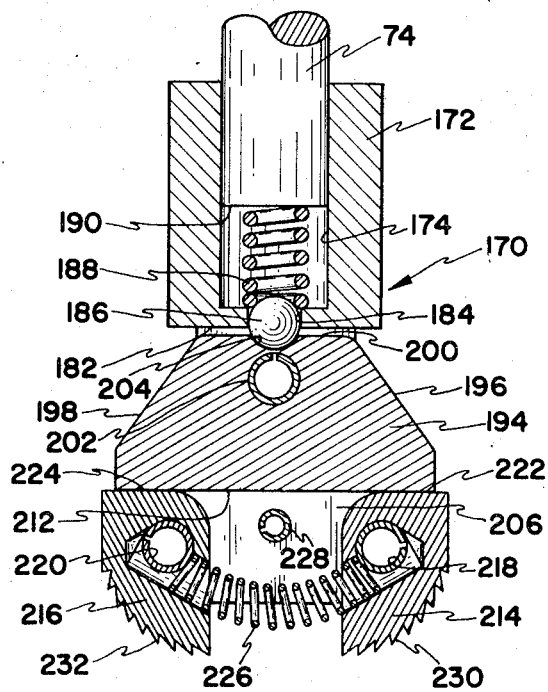
FIG. 9 is a vertical cross section taken along line 9—9 of FIG. 8.

FIGS. 8 and 9

Reference is now made to the clamp embodiment illustrated in FIGS. 8 and 9 and generally designated 170. The clamp 170 is particularly useful where it is desired to join workpieces which are angularly disposed with respect to the horizontal. The clamp 170 does not depend upon the force of gravity to situate the clamp 170 for engagement with workpieces.

Specifically, the clamp 170 comprises a cylindrical sleeve 172 which has an axially disposed bore 174 therein. Bore 174 is adapted to receive the reciprocable piston rod 74 of the pneumatic cylinder 50. Rod 74 may be disposed in any one of a plurality of axial locations within the bore 174, any preselected position of the rod being rigidly maintained by tightening setscrew 176 so that the setscrew tightly engages the rod 74 to prevent relative movement of the rod 74 and the sleeve 172.

Sleeve 172 is provided with downwardly projecting spaced fingers 178 and 180 which are rounded in configuration and together form a clevis structure having a centrally disposed abutment surface 182 (see FIG. 9). The surface 182 has a centrally disposed annular aperture 184 which normally receives a spherical ball 186. Ball 186 is held in the aperture 184 by a compression spring 188 which impinges at one end upon the ball and at the other end upon the lower end 190 of the rod 74. Thus, the position of the rod 74 within the sleeve 172 determines the amount of force exerted by the spring 188 upon the ball 186.

A yoke 192, which is generally configurated in an inverted Y-shape, comprises an upwardly projecting lug 194 having tapered edges 196 and 198 (FIG. 9) and an essentially flat top 200. The lug 194 is interposed between fingers 178 and 180 of the sleeve 172 and is pivotally connected thereto with split and hollow pivot pin 202, as best shown in FIG. 8.

The top 200 of the lug 194 has a centrally disposed annular recess 204 (FIG. 9) into which the ball 186 is normally urged by the spring 188. Thus, although the yoke 192 may be rotated relative to the sleeve 172 about the axis of pin 202, the position illustrated in FIGS. 8 and 9 is the normal at rest position due to the mating nature of the ball 186 and the recess 204.

Yoke 192 has downwardly projecting spaced sides 206 and 208 which define a recess 210 therebetween and a top abutment surface 212 defining the upper limit of the recess 210. Dogs 214 and 216 are respectively pivotally mounted adjacent each end of the yoke 192 by pins 218 and 220.

Clamp dogs 214 and 216 have flat edges 222 and 224, respectively, normally disposed contiguous with the surface 212. Thus, surface 212 acts as a stop defining the limits of outward movements of dogs 214 and 216. Dogs 214 and 216 are urged outwardly to the illustrated at rest position by a normally arcuately shaped compression spring 226 which spans between the dogs 214 and 216 from the pin 218 to the pin 220. Spring 226 normally curves downwardly as illustrated in FIG. 9 so that the edges 222 and 224 are constantly urged against the surface 212 of the yoke 192. A transverse pin or stop 228 is disposed between the dogs 214 and 216 in the sides 206 and 208 of yoke 192. Pin 228 prevents springs 226 from reversing its direction of curvature and, therefore, avoids being displaced upwardly against the surface 212 when the associate cylinder is extended. Each of the dogs 214 and 216 is provided with a curved serrated surface 230 and 232, which is adapted to engage a workpiece so that when rod 74 is downwardly displaced by its cylinder, the dogs 214 and 216 will grip adjacent workpieces and urge the workpieces (a) into tight contiguity and (b) tightly against a work surface.

Importantly, in the event one workpiece is somewhat thicker than an adjacent workpiece with which it is to be joined, the yoke 192 will be downwardly displaced by rod 74 until the thicker workpiece is engaged by one of the dogs. Thereafter, continued downward displacement of the yoke 192 will cause the yoke 192 to pivot about the axis of pin 202 so that the ball 186 will ride up upon the surface 200 of tab 194. Thus, the yoke will tilt until the other dog engages the thinner workpiece. Thereafter, continued downward displacement of the shaft 74 will cause equal force to be exerted through the dogs to bring the workpieces together with the front (downwardmost) faces of the workpieces in exact alignment even though the workpieces have differing thicknesses.

Clearly, where it is desired that the yoke 192 accommodate tilting to exert uniformly distributed force through workpieces having different thicknesses, the rod 74 can be located within the sleeve 172 so as to relieve some of the tension on spring 188 thereby allowing the ball 186 to ride up upon the surface 200 of the tab 194. Also, where workpieces having uniform thicknesses are to be joined, the rod 74 can be adjusted downwardly in the sleeve 172 to exert maximum pressure upon the spring 188. Thus, the ball 186 will be held rigidly in the recess 204 to prevent any rotation of the yoke 192 relative to the sleeve 172. It can also be appreciated, that since the compression spring 226 maintains the dogs 214 and 216 in the normal position prior to engagement with a workpiece, the clamp 170 may be successfully used on workpieces which are inclined substantially with respect to the horizontal.

In cases where the apparatus 170 is reciprocated in essentially vertical manner, the spring 188 and the ball 186 can be eliminated independent of whether the workpieces have the same or different thicknesses.

FIGS. 10 and 11

Attention is now directed to the drill guide generally designated 234 and illustrated in FIGS. 10 and 11. The drill guide 234 preferably comprises a rectangular platform 236 which is essentially flat on the upper surface 238 thereof and is provided with parallel channels 240 and 242 which open at the underside 244 of the platform 236. Preferably, the channels 240 and 244 extend the entire length of the platform 236. A central rib 246 exists between the channels 240 and 242 (see FIG. 11).

The sides 248 and 250 are tapered inwardly and upwardly and are provided with spaced transverse apertures 252, which are slanted so that the axis of the apertures passes through the channels 240 and 244 and beneath the central rib 246. Thus, a drill bit 254 which is driven by a conventional drill 256 will pass through the apertures 252, channels 240 or 242, into the workpiece 26, across the butt joint between edges 27 and 29 and into the workpiece 28 without touching the central rib 246 (see FIG. 8). The apertures 252 on the side 250 are laterally offset from the apertures (not shown) in the side 248 so that spaced drill holes across the adjoining faces 27 and 29 of the workpieces 26 and 28 may be made in both directions.

As illustrated in FIGS. 10 and 11, a pneumatic cylinder 258 which may be essentially the same as pneumatic cylinder 50 (FIG. 2) with the carriage plate 52 removed, is integrally joined to the upper surface 238 of platform 236, such as by bolts 260. A reciprocable piston rod 74 (FIG. 10) which is essentially identical to rod 74 illustrated in FIG. 2, is connected to a spacing rod 262 adapted to abut the cross beam 36.

In the method of using the drill guide 234, after the workpiece 26 and 28 have been brought into tight contiguity by clamp structure 94, 140 or 170, the platform 236 is positioned over the joint so that the central rib 246 is disposed immediately over abutting edges 27 and 29. Thereafter, pneumatic cylinder 258 is actuated so that rod 262 impinges upon the crossmember 40 of the beam 36 (FIG. 3) to tightly restrain the platform 236 over the joint. A conventional drill 256 is then positioned so that the correctly sized drill bit 254 is serially passed into each of the apertures 252 and the bit is rotated by a conventional drill to bore through both workpieces 28 and 26 across abutting faces 27 and 29 as illustrated in FIG. 11. Thereafter, woodscrews or the like may be used to permanently unite workpieces 28 and 26. Also, if desired, adhesive material may be placed upon the faces 27 and 29 of the workpieces 26 and 28 prior to engagement by the clamp in order to improve the joint between the workpieces 26 and 28.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. Apparatus for restraining at least two workpieces in edge-to-edge tight contiguous relation comprising a force-applying mechanism including a first surface-engaging eccentric structure pivotally carried by linkage structure for applying force to one workpiece at least partially in the direction of the other workpiece and second surface-engaging eccentric structure spaced from and opposed to the first eccentric structure pivotally carried by linkage structure for applying force to the other workpiece at least partially in the direction of the one workpiece and power means for selectively reciprocating the eccentric structure and the linkage structure between extended and retracted positions.

2. Apparatus of the type defined in claim 1 wherein each eccentric structure comprises a dog asymmetrically pivotally carried by the linkage means and presenting workpiece-engaging teeth along a curved surface of the dog.

3. Apparatus of the type defined in claim 1 wherein each eccentric structure comprises a toothed wheel eccentrically pivotally carried by the linkage means.

4. Apparatus of the type defined in claim 1 further comprising stop means limiting the amount to which each eccentric means may pivot upon engaging either workpiece.

5. Apparatus of the type defined in claim 1 further comprising biasing means urging each eccentric structure pivotally away from the other.

6. Apparatus of the type defined in claim 1 wherein said linkage structure comprises bracket structure pivotally related to the power means.

7. Apparatus of the type defined in claim 6 further comprising detent means associated with said pivot between the bracket structure and the power means to disable the pivot and rigidly relate the bracket structure to the power means.

8. Apparatus of the type defined in claim 7 wherein said detent means comprises a spherical member interposed between a socket and a compression spring.

9. Apparatus of the type defined in claim 6 further comprising stop means limiting the amount to which the bracket structure may pivot in either direction relative to the power means.

10. Apparatus of the type defined in claim 1 further comprising power drill guide means for placement and power retention transversely across the edge-to-edge contiguity between the workpieces, said drill guide means comprising bore means defining at least one angular drill path adapted to accommodate the drilling of a blind bore in the workpieces across the edge-to-edge contiguity.

11. Apparatus of the type defined in claim 1 further comprising platform structure and support structure holding the force-applying mechanism juxtaposed the platform structure for manipulation between the extended and retracted positions whereby workpieces surfaces opposite the support structure are pressed tightly against the platform structure and opposed edges of the workpieces are made snugly contiguous to form a smooth face-to-face joint between the workpieces.

12. Apparatus of the type defined in claim 11 wherein the force-applying mechanism is slidably related to the support structure to allow for selective positioning of the mechanism in any one of several positions relative to the support structure.

13. A device for forcing adjacent workpieces into edge-to-edge contiguity to form a joint comprising
bracket means;
surface-engaging leg means pivotally attached to and depending downwardly and inwardly from the bracket means for engaging and applying lateral pressure to juxtaposed surface of the workpieces;
means for supporting the bracket above a work surface upon which the opposed workpieces are disposed; and
drive means carried by the supporting means and acting upon the bracket means for reciprocably displacing the bracket means from a remote position to an engaging position whereby the surface-engaging means engage and force the opposed workpieces together into contiguity.

14. A device as defined in claim 13 wherein said surface-engaging means comprises downwardly and inwardly inclined projecting fingers at least one of which engages each of the opposed workpieces so that, when the bracket means is displaced, the fingers grip the workpieces and move inwardly toward one another to force the workpieces together.

15. A device as defined in claim 13 wherein said leg means comprises cam eccentrically pivotally mounted upon the bracket means and formed with generally arcuate engaging surfaces with the radius of said arcuate surfaces extending from a point laterally displaced from the pivot point of said cams so that when the cams engage the opposed workpieces the cams rotate toward one another around the eccentric mounting to force the opposed workpieces together.

16. A device as defined in claim 13 wherein said supporting means comprises an elevated beam disposed above the opposed workpieces, the beam comprising means for supporting the surface-engaging means in any one of a plurality of locations along the length of the beam and wherein said displacing means comprises fluid cylinder means for selectively displacing the attached surface-engaging means into or out of engagement with the opposed workpieces at the election of an operator.

17. Apparatus for forming a joint between at least two workpieces comprising:
a work surface upon which the at least two workpieces are disposed so that edges to be joined are in juxtaposition;
a beam rigidly surmounting the workpieces in spaced relation;
power means carried by the beam;
linkage means interposed between the power means and the beam so that the power means are selectively positionable along the axial length of the beam to any one of a plurality of positions;
opposed eccentric means associated with and responsive to the power means, and adapted to engage, grip and force together both of the workpieces; and
means for actuating the power means to cause the eccentric means to be displaced so that the workpieces are engaged by the eccentric means and forced tightly together.

* * * * *